(12) United States Patent
Zhang et al.

(10) Patent No.: US 6,680,349 B2
(45) Date of Patent: Jan. 20, 2004

(54) ORGANOHYBRID-BASED DAMPING MATERIAL, METHOD FOR PRODUCING THE SAME, AND DAMPING IMPROVER FOR DAMPING MATERIAL

(75) Inventors: Cheng Zhang, Tokyo (JP); Tadashi Miura, Iruma (JP); Masao Sumita, Ayase (JP)

(73) Assignee: Masao Sumita, Kanagawa (JP)

( * ) Notice: Subject to any disclaimer, the term of this patent is extended or adjusted under 35 U.S.C. 154(b) by 84 days.

(21) Appl. No.: 09/822,266

(22) Filed: Apr. 2, 2001

(65) Prior Publication Data

US 2002/0049267 A1 Apr. 25, 2002

(30) Foreign Application Priority Data

Aug. 31, 2000 (JP) ........................................ 2000-263925

(51) Int. Cl.[7] ................................................. C08K 5/45
(52) U.S. Cl. .................... 524/82; 524/210; 524/237; 524/323; 524/324
(58) Field of Search ................. 524/82, 323, 324, 524/210, 237, 330, 334

(56) References Cited

U.S. PATENT DOCUMENTS

| | | | | |
|---|---|---|---|---|
| 4,595,515 A | * | 6/1986 | Wakino et al. ............... | 252/62 |
| 4,927,553 A | * | 5/1990 | Wright et al. ............... | 508/200 |
| 5,744,566 A | * | 4/1998 | Tsutsui et al. ............... | 526/336 |
| 6,002,196 A | * | 12/1999 | Sumita et al. ............... | 310/326 |
| 6,184,292 B1 | * | 2/2001 | Hall et al. ................... | 525/185 |
| 6,245,439 B1 | * | 6/2001 | Yamada et al. ............. | 428/546 |

FOREIGN PATENT DOCUMENTS

| | | |
|---|---|---|
| FR | 2651690 A | 3/1991 |
| JP | 11068190 | 3/1999 |
| JP | 2000-273435 | * 10/2000 |

* cited by examiner

Primary Examiner—David W. Wu
Assistant Examiner—Henry S. Hu
(74) Attorney, Agent, or Firm—Birch, Stewart, Kolasch & Birch, LLP

(57) ABSTRACT

An organohybrid-based damping material for controlling unwanted vibration and noise, an organic damping improver exhibiting piezoelectric, dielectric and electroconductive effects, and their producing methods, are provided. The damping material comprises a polymer matrix having a polar side chain and a damping improver composed of a compound containing basic nitrogen and a phenol-based compound. The damping material shows an excellent damping properties, alleviates the functional deterioration, and is applicable to different application temperature regions and wide areas.

13 Claims, 6 Drawing Sheets

US 6,680,349 B2

ORGANOHYBRID-BASED DAMPING MATERIAL, METHOD FOR PRODUCING THE SAME, AND DAMPING IMPROVER FOR DAMPING MATERIAL

FIELD OF THE INVENTION

This invention relates to an organohybrid-based damping material, a method for producing the same and a damping improver for the organohybrid-based damping material. More particularly, it relates to the damping material, which efficiently absorbs mechanical energy and dissipates it as thermal energy to dampen unwanted noise and vibration, comprising a polymer matrix and an organic damping improver exhibiting piezoelectric, dielectric and electroconductive effects.

The damping material provided by the present invention is high in damping efficiency, controlled in functional deterioration when put in service for extended periods, and applicable to different application temperature regions and wide areas, including electric appliances, machines, chemistry, construction/civil engineering, and transportation.

DESCRIPTION OF THE RELATED ART

Damping of vibration and noise has become an important requirement in the design of automotive and aerospace structure. Active and passive damping are two types of generally used methods for the control of the unwanted vibration and noise. Passive damping control generates more increased interest due to its reduced system complexity. In such a system the damping material, which can convert sound or mechanical vibration energy into heat plays a important role.

One of normal measures against noise produced by, e.g., home electric appliances and vehicles, especially while they are running on highways and bridges, are thick walls of metal and inorganic materials. The damping efficiency of such materials obeys mass law, i.e., increasing their weight will reduce noise more efficiently. However, increasing thickness or weight of sound insulating walls of inorganic materials needs high costs and special structural considerations. Although porous fibers (e.g., rock wool, glass wool and other porous fibers) can be used to decrease the weight of sound and vibration insulating materials, these materials have insufficient damping efficiency in a low frequency region, and can not reduce the size or thickness of insulating wall. On the other hand, double-structured walls for reducing wall weight may result in a decrease in sound transmission loss at a specific frequency because of the resonance produced by the wall masses and air spring between them, causing insufficient sound insulation.

Another of typical candidate materials for the application of passive damping are viscoelastic polymers, which are relatively lighter and exhibits higher damping efficiency compared to metal and inorganic materials. Since the dissipation of the mechanical energy of a polymer is most efficient in the vicinity of its glass transition temperature, a polymer with a higher damping peak around application temperature is preferred. However, the glass transitions of most polymers are distant from room temperature unfortunately. Therefore, either how to control the damping peak position to locate within a required temperature region or to enhance the damping peak intensity of the polymer-based damping material is of great importance. Although the use of interpenetrating polymer networks (IPN) obtained from emulsion polymerization has been thought a very effective way to broaden the damping peak, it is often applied as paint instead of a structure material due to the difficulty of elimination of water. Blending binary or ternary polymers with moderate miscibility has been considered as another approach to damping peak broadening, whereas the location of damping peak position is restricted within the glass transitions of two polymers, and it fails to improve the damping peak intensity. The addition of small-molecular-weight plasticizer indeed causes an increase in the damping peak maximum, but the damping peak position is shifted to a lower temperature and the storage modulus is reduced unfortunately. On the other hand, polymeric composites filled with inorganic particles or fibers can provide high stiffness and strength, whereas the damping peak maximum decreases sharply.

To solve the above-mentioned problems, a polymer-based composite damping material containing piezoelectric ceramic powders and electrical conductive particles has been developed. The damping mechanism of such a composite is assumed to be due to the energy transferring effect through the cooperation among the components. The mechanical vibrating energy is first transmitted to the piezoelectric ceramic powder, and converted into alternating electrical potential energy by the piezoelectric effect. Then, the electrical potential energy is further converted into Joule's heat through the networks of electrical conductive particles in the polymeric matrix. Although the damping mechanism of such a kind of composite is unique, this damping material exhibits low loss tangent (tan $\delta$) of 0.5 or so at the highest due to the dismatch between the inorganic filler particles and polymer matrix, resulting in insufficient damping efficiency for practical use unfortunately. To improve the interaction among the components, a damping material comprising an organic low-molecular-weight additive and a polymer matrix has been also proposed. For example, Japanese Patent Application Laid-Open No. 68190/1999 disclosed a damping material comprising N,N-dicyclohexyl-2-benzothiazolyl-sulfenamide as the organic low-molecular-weight additive and chlorinated polyethylene as the matrix. Those proposed so far, however, have a disadvantage of insufficient stability, deteriorating in the functions when put in service for extended periods due to the phase separation resulting from massive formation of the free crystals, wherein N,N-dicyclohexyl-2-benzothiazolyl-sulfenamide is the main component. Meanwhile, these attempts have failed to control the damping peak position to locate within a required temperature region.

From the viewpoint of application, the best polymer-based damping material should possess both excellent damping and high stiffness, while its glass transition can be controlled to meet different practical requirements. The inventors of the present invention also found that increasing loss tangent (tan $\delta$) and loss modulus (E") simultaneously is required to enhance the efficiency of vibration and sound absorption of the damping material. However, as described above, no material satisfying the above requirements has been developed up to now.

DISCLOSURE OF THE INVENTION

It is an object of the present invention to provide an organohybrid-based damping material, which is composed of a polymer matrix and an organic damping improver exhibiting piezoelectric, dielectric and electroconductive effects. This damping material shows a high degree of damping efficiency and a limited extent of temporal deterioration. Moreover, the damping peak position can be controlled to locate within a required temperature region.

It is another object of the present invention to provide an organic damping improver, which comprises at least one organic piezoelectric, dielectric and electroconductive material containing basic nitrogen and one specific organic additive. The damping improver both enhances damping efficiency excellently and improves the stability of damping properties against aging successfully, and achieves the control of damping peak position to locate within a required temperature region as well.

It is still another object of the present invention to provide a method for producing the organohybrid-based damping material and the damping improver. The manufacturing methods include the selection of the components, the mixing procedure and molding process to obtain the final products.

It is still another object of the present invention to provide a damping material which satisfy both the loss tangent (tan δ) and loss elastic modulus (E") requirements simultaneously. This means that the invented damping material possesses both excellent damping efficiency and high stiffness. The present invention also provide a method for producing the material to achieve the above purposes.

The inventors of the present invention have noticed that for the damping improver, importance of the second specific organic additive, which shows a strong interaction with the organic piezoelectric, dielectric and electroconductive material containing basic nitrogen and can efficiently control the crystallization and crystal growth of the components. The inventors have also found that the second additive has a synergistic effect on the damping improvement with the piezoelectric, dielectric and electroconductive material, and a specific phenolic compound having a suitable molecular weight is useful for the above purposes based on extensive studies.

The first invention relates to an organohybrid-based damping material, comprising a polymer matrix having a polar side chain and an organic damping improver exhibiting piezoelectric, dielectric and electroconductive effects. The damping improver is composed of a mixture of a compound (I) containing basic nitrogen and a phenolic compound (II):

(I) at least one compound containing basic nitrogen, selected from the group consisting of sulfenamides, benzothiazoles, benzotriazoles and guanidines, and (II) at least one phenolic compound shown by the general formula (1):

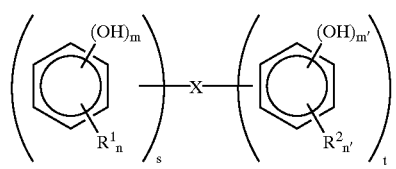

wherein,
(1) $R^1$ and $R^2$ are each a hydrocarbon group having a carbon number of 1 to 10, and may be the same or different,
(2) (n) and (n') are an integer of 0 to 3, and may be the same or different,
(3) (m) and (m') are an integer of 1 or 2, and may be the same or different,
(4) (s) and (t) are an integer of 1 to 3, and may be the same or different, and
(5) X is at least one bonding group selected from the group consisting of oxygen atom, sulfur atom, a halogen atom, a hydrocarbon group which may contain at least one of the above atoms and has a carbon number of 1 to 20, and a group containing an ester linkage.

The ratio of the polymer matrix and the damping improver is from 80/20 to 20/80 by weight.

The second invention relates to an organic damping improver, which is to be incorporated in the polymer matrix to exhibit piezoelectric, dielectric and electroconductive effects, and is composed of a mixture of a compound (I) containing basic nitrogen and a specific phenolic compound (II):

(I) at least one compound containing basic nitrogen, selected from the group consisting of sulfenamides, benzothiazoles, and guanidines, and (II) at least one phenolic compound shown by the general formula (1):

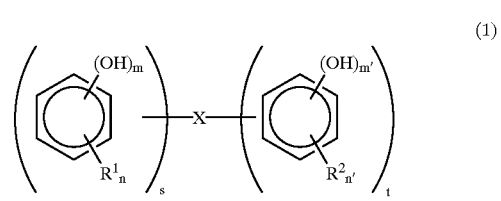

wherein,
(1) $R^1$ and $R^2$ are each a hydrocarbon group having a carbon number of 1 to 10, and may be the same or different,
(2) (n) and (n') are an integer of 0 to 3, and may be the same or different,
(3) (m) and (m') are an integer of 1 or 2, and may be the same or different,
(4) (s) and (t) are an integer of 1 to 3, and may be the same or different, and
(5) X is at least one bonding group selected from the group consisting of oxygen atom, sulfur atom, a halogen atom, a hydrocarbon group which may contain at least one of the above atoms and has a carbon number of 1 to 20, and a group containing an ester linkage.

in a compound (I)/compound (II) ratio of 100/2 to 50 by weight.

The third invention relates to a method for producing the damping material composed of a polymer matrix and an organic damping improver exhibiting piezoelectric, dielectric and electroconductive effects, and comprising the following steps (a) and (b):

Step (a): a step of uniformly mixing (1) the polymer matrix and the material exhibiting piezoelectric, dielectric and electroconductive effects, and (2) the above mixture and the second specific additive which shows a strong interaction with the organic piezoelectric, dielectric and electroconductive material containing basic nitrogen and can efficiently control the crystallization and crystal growth of the components, as well as the fourth constituent material, at room temperature or higher by a two-roll mill, an extruder or other mixers, and Step (b): a step of molding the mixture produced by the above step (a) at a temperature from 40 to 200° C. by hot pressing, stretching, extrusion, injection or other molding processes.

EMBODIMENTS OF THE INVENTION

Figure 1:
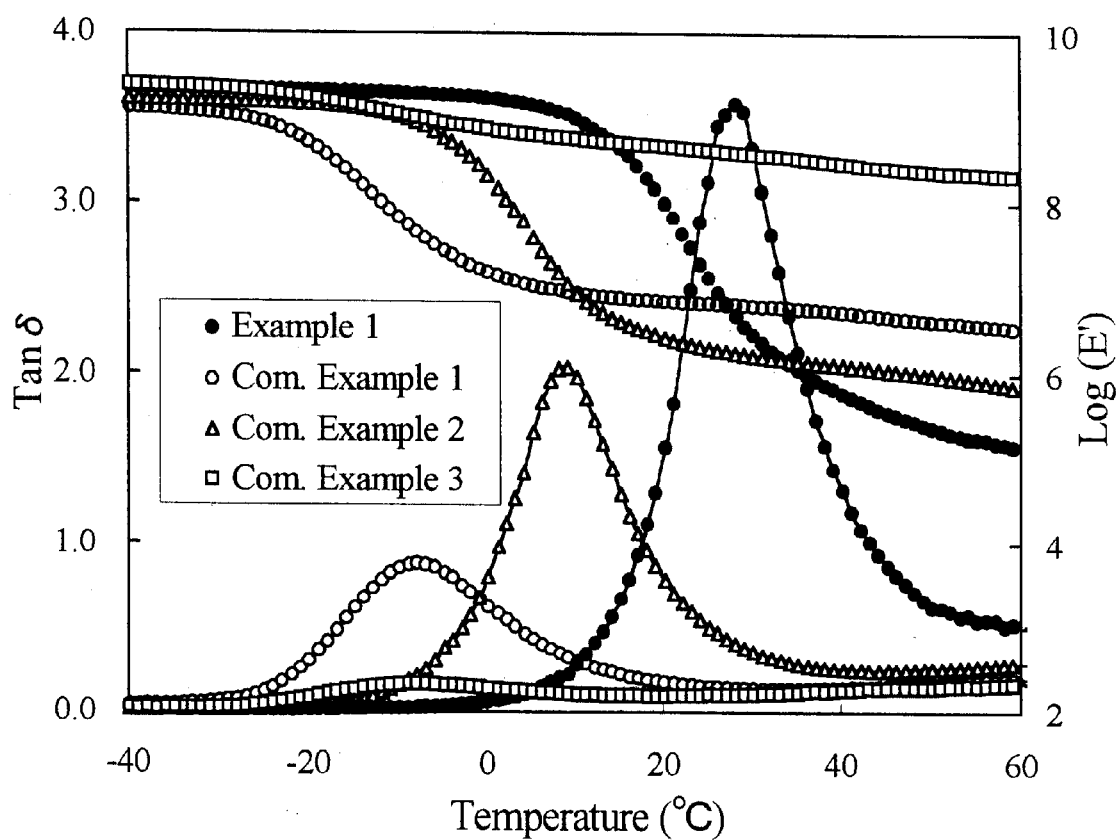
FIG. 1 shows temperature dependence of loss tangent (tan δ) and storage modulus of the damping materials prepared by EXAMPLE 1 and those prepared by COMPARATIVE EXAMPLES.

The present invention is more concretely described below:

The polymer useful as a constituent for the damping material of the present invention and functioning as the matrix therefor is not limited, so long as it has a given molecular weight. It may be crystalline or noncrystalline, and polar or nonpolar. The concrete examples include polyolefins, e.g., low-density polyethylene, high-density polyethylene, polypropylene, polybutene, polyisoprene, polystyrene, and in particular, halogenated polyolefins, e.g., chlorinated polyolefins and fluorinated polyolefins, more concretely, chlorinated polyethylene, chlorinated polypropylene, fluorinated polyethylene and fluorinated polypropylene; and butylene rubber, acrylic rubber, butyl rubber, chloroprene, styrene-butadiene rubber (SBR), thermoplastic elastomer (ethylene-propylene rubber), polyurethane, acrylate-based resin, epoxy-based resin, polycarbonate-based resin, polyester-based resin, polyether-based resin, vinyl acetate-based resin, ethylene-vinyl acetate copolymer, ethylene-chlorinated vinyl copolymer, ethylene-methacrylate-based resin, acrylonitrile-styrene copolymer and acrylonitrile-butadiene-styrene copolymer. The polymer matrix may be freely selected from the above compounds for specific purposes of the damping material. The preferable polymers are those having a polar side chain, e.g., chlorinated polyolefins, fluorinated polyolefins and polyurethane resin. The preferable chlorinated polyolefins include those from a monomer having a carbon number of 2 to 4, e.g., chlorinated polyethylene, chlorinated polypropylene and chlorinated butylene polymers. Chlorinated polyethylene, and a mixture, polyblend or a block copolymer containing chlorinated polyethylene are more preferable.

Chlorinated polyethylenes useful for the present invention include copolymer of ethylene chloride, copolymer (including block copolymer) of ethylene chloride and ethylene, and chlorination-treated polyethylene. Commercially available ones include Showa Denko's Elaslene 301A (E).

Polyurethane resin useful for the present invention has a urethane bond —NHCOO— in the repeating unit in the main chain, and may be normally prepared by condensation polymerization between organodiisocyanate and high-molecular-weight diol. The organic diisocyanates useful for the present invention include 4,4'-diphenylmethane diisocyanate, p-phenylene diisocyanate, tolylene diisocyanate, and 4,4'-dicyclohexylmethane diisocyanate, which are normally used as the stocks for producing polyurethane. The high-molecular-weight diols useful for the present invention include polyether type ones, e.g., polyoxypropylene glycol and polyoxypropylene-polyoxyethylene glycol, although not limited. The polyurethane useful as the polymer matrix for the damping material of the present invention preferably contains a middle or high-molecular-weight diol, having an average molecular weight of 500 to 10,000, preferably 1,000 to 7,000.

The second constituent material for the damping material of the present invention is a compound containing basic nitrogen. More concretely, these compounds include sulfenamides, benzothiazoles, benzotriazoles and guanidines.

The sulfenamides useful for the present invention include benzothiazolyl sulfenamides as the derivatives of the compounds shown by the general formula $RSNH_2$, e.g., N-cyclohexyl-2-benzothiazolyl sulfenamide, N-tertiary butyl-2-benzothiazolyl sulfenamide, N,N-oxydiethylene-2-benzothiazolyl sulfenamide, N,N-dicyclohexyl-2-benzothiazolyl sulfenamide, and N,N-diisopropyl-2-benzothiazolyl sulfenamide. Of these compounds, N,N-dicyclohexyl-2-benzothiazolyl sulfenamide is particularly preferable from the viewpoint of damping effect.

Benzothiazoles useful for the present invention contain basic nitrogen, including 2-(N,N-diethylthiocarbamoylthio) benzothiazole and 2-(4'-morpholinodithio) benzothiazole, although not limited thereto. Benzotriazoles useful for the present invention contain basic nitrogen, including 2-[2'-hydroxy-5'-methylphenyl]-benzotriazole and 2-[2'-hydroxy-3'-t-butyl-5'-methylphenyl]-5-chlorobenzotriazole, also not limited thereto.

Guanidines useful for the present invention contain basic nitrogen, including 1,3-diphenylguanidine and di-o-tolylguanidine.

The phenolic compound is shown by the general formula (1):

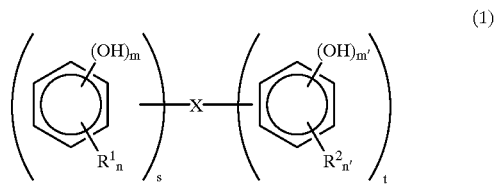

(1)

wherein, $R^1$ and $R^2$ are each an alkyl group having a carbon number of 1 to 10, and may be the same or different, more concretely methyl, ethyl, n-propyl, i-propyl, n-butyl, i-butyl, t-butyl, n-pentyl and i-pentyl;

(n) and (n') are an integer of 0 to 3, and may be the same or different;

(m) and (m') are an integer of 1 or 2, and may be the same or different; and (s) and (t) are an integer of 1 to 3, and may be the same or different.

X is an atom selected from the group consisting of oxygen, sulfur and a halogen, or hydrocarbon group, which may contain at least one of the above atoms and has a carbon number of 1 to 20, and a group containing an ester linkage, serving to bond the phenolic groups to each other. The hydrocarbon groups useful for the present invention include alkylene and cycloalkylene, e.g., methylene, ethylene, propylene, n-butylene, i-butylene, pentylene, hexylene and heptylene, and unsaturated groups thereof, e.g., vinylene, propylidene, isopropylidene, butylidene, isobutylidene, cyclohexylene, and aromatic groups. Of these bonding groups, preferable ones include those shown by the general formulae (1) to (3), shown below:

  (1)

  (2)

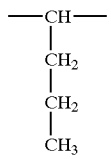  (3)

The groups containing ester bond useful for the present invention contain —CO—O—, including those shown by the general formulae (4) to (7), shown below. Of these, particularly useful one is the tetraester type, shown by the general formula (7).

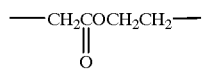  (4)

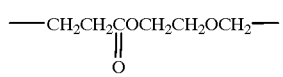  (5)

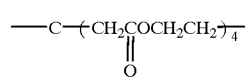  (6)

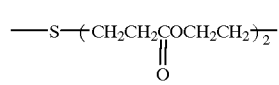  (7)

More concretely, the phenolic compounds shown by the above general formula (1) include 4,4'-thiobis(3-methyl-6-tertiary butylphenol), 4,4'-thiobis (2-methyl-2-tertiary butylphenol), 4,4'-thiobis(4,6-ditertiary butylphenol), 4,4'-methylenebis(2,6-ditertiary butylphenol), 4,4'-ethylenebis (2,6-ditertiary butylphenol), 4,4'-propylenebis (2-methyl-6-tertiary butylphenol), 2,2'-methylenebis(4-ethyl-6-tertiary butylphenol), 2,2'-methylenebis(4-methyl-6-tertiary butylphenol), 4,4'-butylidenebis (3-methyl-6-tertiary butylphenol), 4,4'-isopropylidenebis (2,6-ditertiary butylphenol), 2,2'-methylenebis (4-methyl-6-nonylphenol), 2,2'-isobutylidenebis (4, 6-dimethylphenol), 2,2'-methylenebis (4-methyl-6-cyclohexylphenol), 1,6-hexanediol-bis [β-(3,5-ditertiary butyl -4-hydroxyphenyl) propionate], 1,4-bis (4-benzoyl-3-hydroxyphenoxy)-butane, 2,2-thio-diethylenebis [β-(3,5-ditertiary-butyl-4-hydroxyphenyl)propionate], tris(3,5-ditertiary-butyl-4-hydroxybenzyl)-isocyanurate, 1,1,3-tris(5-tertiary-butyl-4-hydroxy-2-methylphenyl)butane, 1,3,5-trimethyl-2,4,6-tris (3,5-ditertiary-butyl-4-hydroxybenzyl)-benzene, tetrakis [methylene(3,5-ditertiary-buty-4-hydroxycinnamate)], triethyleneglycol-bis[β-(3,5-ditertiary-butyl-5-methyl-4-hydroxy-phenyl)propionate], and 3,9-bis[1,1-dimethyl-2-[β-(3-tertiary-butyl-4-hydroxy-5-methylphenyl)-propionyloxyethyl]ethyl]-2,4,8,10-tetraoxospiro-[5-,5] undecane.

The phenolic compound as the constituent component for the damping material of the present invention preferably has a molecular weight of 200 or more, more preferably 230 or more, viewed from controlling aging of the damping properties. The mechanisms involved in the significantly improved damping effects in the presence of the relative high molecular weight phenolic compound are not fully understood. It is however considered that the phenolic compound with a suitable molecular weight works to control the crystallization the compound containing basic nitrogen because of the strong interaction between the two components, and efficiently hinders the phase separation process,.

The damping material of the present invention may be incorporated with, e.g., a phthalate ester or oligomer, so long as it does not inhibit the functions of the above compound having basic nitrogen or phenolic compound. The examples of phthalate ester include dihexyl phthalate, dioctyl phthalate, dipentyl phthalate, and dicyclohexyl phthalate.

The damping improver exhibiting piezoelectric, dielectric and electroconductive effects can be contained at 5 to 80 wt. %, based on the whole damping material, preferably 10 to 70 wt. %. At below 5 wt. %, the damping material may not exhibit the sufficient damping performance. At above 80 wt. %, on the other hand, the damping efficiency may not be further enhanced, and other problems, e.g., phase separation, may occur.

The phenolic compound is contained at 2 to 50 wt. %, based on the total quantity of itself and the compound having basic nitrogen, preferably 4 to 40 wt. %. At below 2 wt. %, the damping properties, in particular aging stability, may not be sufficiently exhibited. At above 50 wt. %, on the other hand, the damping efficiency may decrease again.

The damping material of the present invention may be also incorporated with a fourth constituent material, e.g., inorganic fibers, carbon black or carbon fibers. The inorganic fibers useful for the present invention include ceramic fibers, e.g., silicon nitride, silicon carbide, alumina and glass fibers. The carbon fibers may be either PAN-based or pitch-based. The inorganic and carbon fibers may be either long or short with different aspect ratio, to be freely selected depending on specific purposes of the damping material.

The damping material of the present invention may be uniformly dispersed with at least one reinforcing filler with different shape selected from the group consisting of calcium carbonate, mica, talc, alumina, silica-alumina and graphite, as required, in order to improve its modulus of elasticity. The filler may be contained at 1 to 70 wt. %, based on the whole damping material, preferably 5 to 50 wt. %.

As the magnitude of damping can be determined from dynamic mechanical behavior, in which loss tangent (tan δ) is usually used as a measure of damping and storage modulus is used a measure of stiffness, the damping properties of the invented material are evaluated by means of Dynamic Mechanical Analysis (DMA).

FIG. 1 shows temperature dependence of loss tangent (tan δ) and storage modulus of the damping materials prepared by EXAMPLE 1 and those prepared by COMPARATIVE EXAMPLES. Compared to COMPARATIVE EXAMPLE 1, the loss tangent (tan δ) maximum for COMPARATIVE EXAMPLE 3 decreases sharply, while there is no obvious shift in the damping peak position. As a result, although COMPARATIVE EXAMPLE 3 exhibits a relative high value of storage modulus, its damping efficiency is too poor to meet the practical requirements. On the other hand, COMPARATIVE EXAMPLE 2 shows a relative high loss tangent (tan δ) maximum, and its damping peak shifts to a higher temperature. One of interesting points is that for EXAMPLE 1, wherein a small amount of Additive 2 is incorporated, the damping peak maximum is enhanced dramatically, while its position shifts to a very high temperature. This indicates that EXAMPLE 1 is high in damping efficiency and Additive 2 may have a synergistic effect with Additive 1 exhibiting piezoelectric, dielectric and electroconductive effects.

Figure 2:
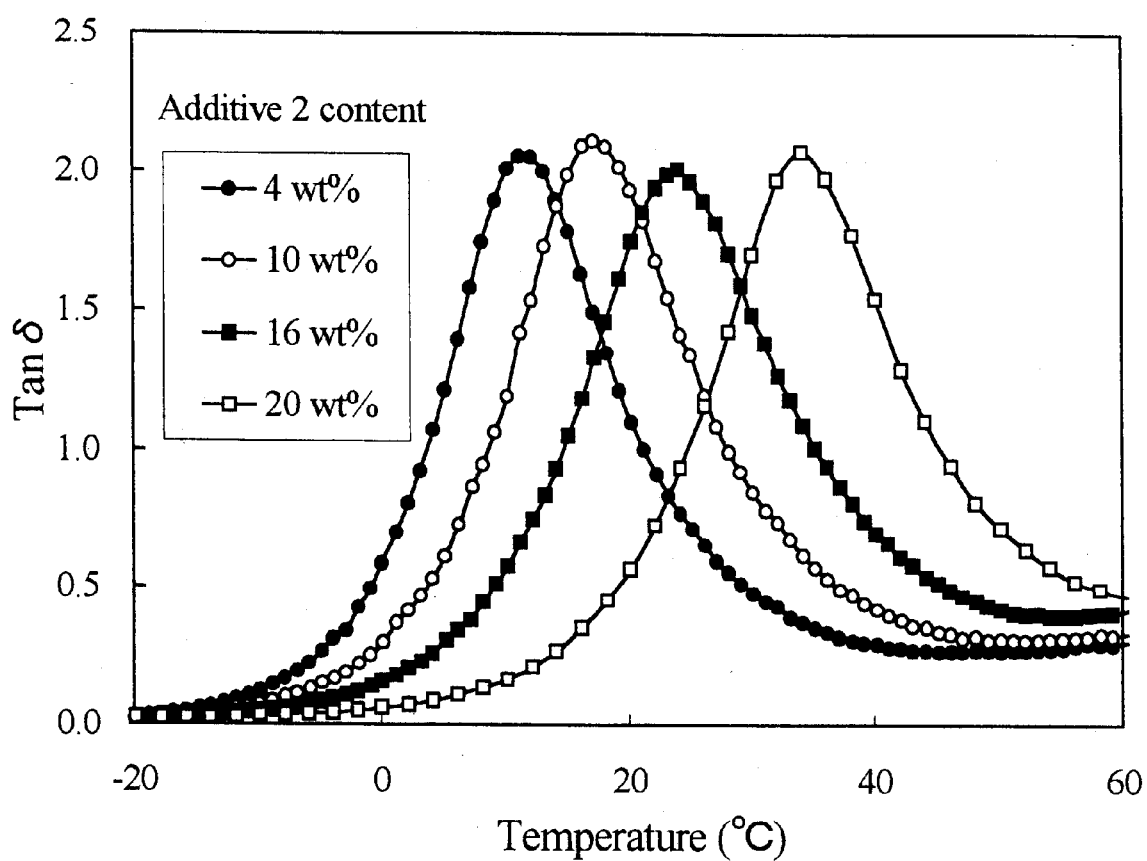
FIG. 2 shows temperature dependence of loss tangent (tan δ) of damping materials prepared under the same condition as EXAMPLE 1 as a function of Additive 2 content (Matrix/Additive 1=1:1).
Figure 3:
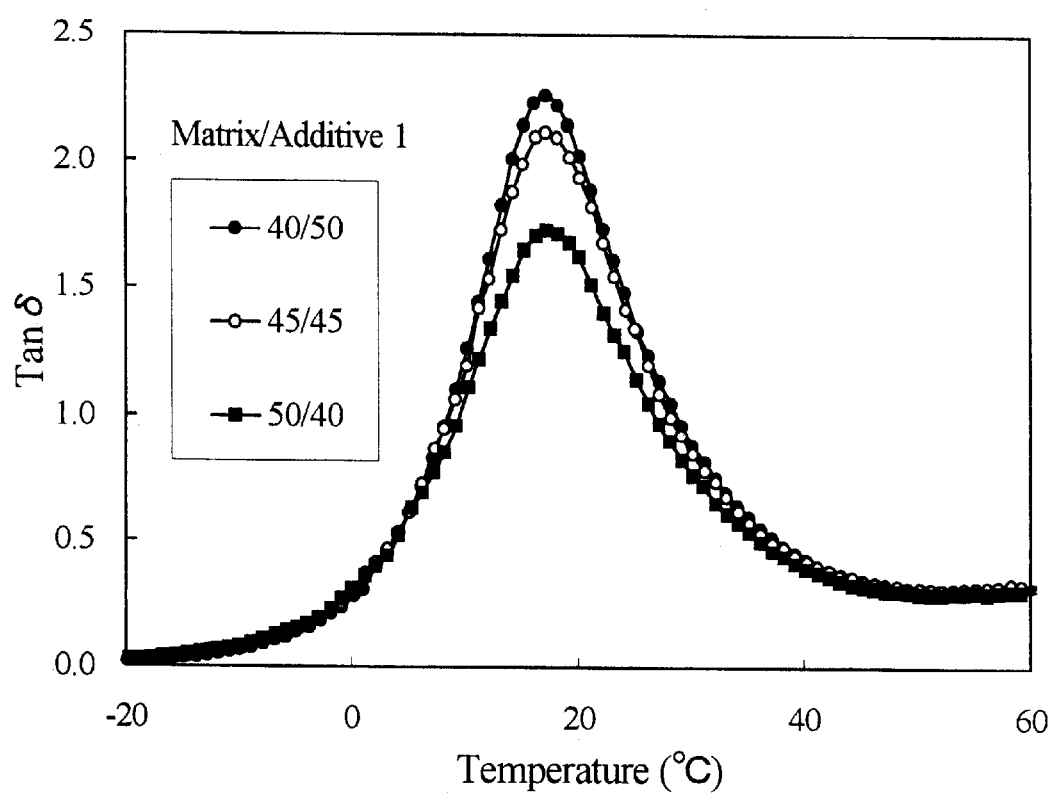
FIG. 3 shows temperature dependence of loss tangent (tan δ) of damping materials prepared under the same condition as EXAMPLE 1 as a function of Matrix/Additive 1 ratio (Additive 2=10 wt. %).

Another interesting point should be noted in FIGS. 2 and 3, which show composition dependence of loss tangent (tan δ) of damping materials prepared under the same condition as EXAMPLE 1. It was found that, when Matrix/Additive 1 ratio is kept at 1 and Additive 2 content is below 20 wt. %, the values of tan δ maximum are just the same for all the samples, while damping peak position shifts to a higher temperature at a higher Additive 2 concentration. On the other hand, when Additive 2 content is fixed at 10 wt. %, tan δ maximum increases with decreasing Matrix/Additive 1 ratio, while there is only a little shift in damping position within the ratio range of 0.75–1.25. These results suggest that either tan δ maximum or damping peak position can be controlled freely by changing the composition, and a series of high-performance damping materials used under different practical temperatures may be designed and obtained by only adding a small amount of phenolic compound in the hybrids.

Figure 4:
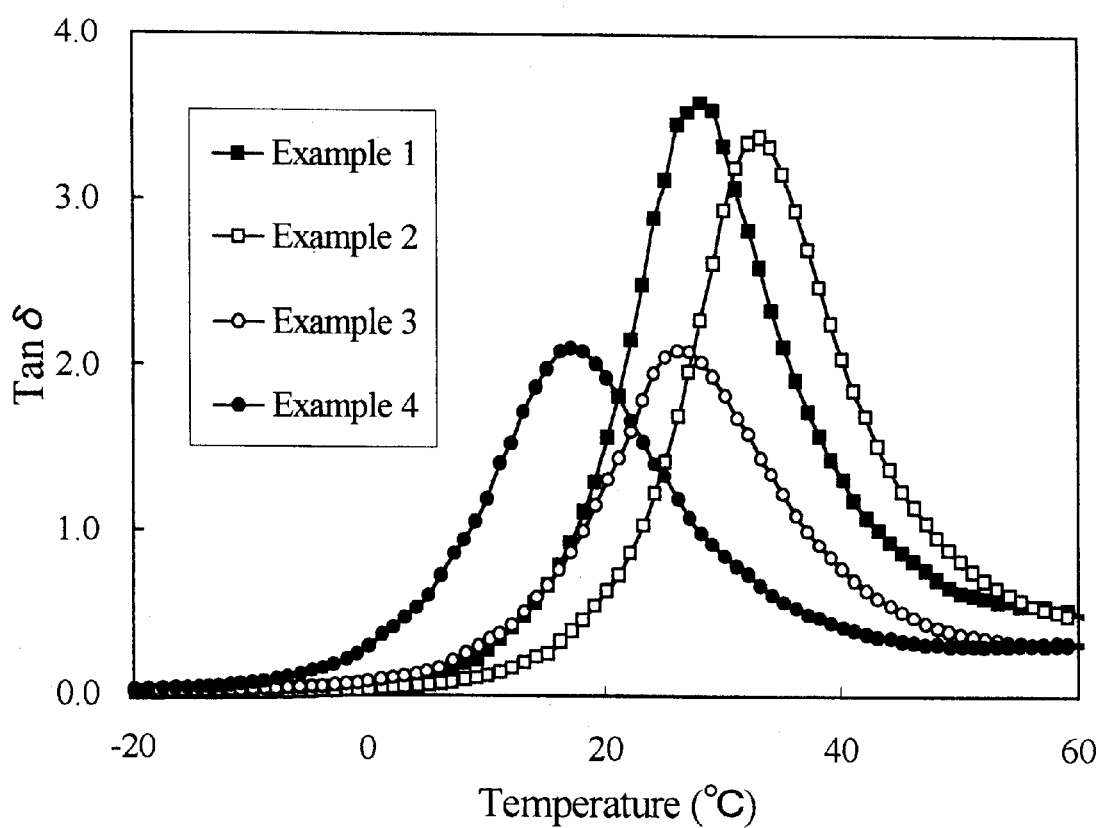
FIG. 4 shows temperature dependence of loss tangent (tan δ) of the damping materials prepared by EXAMPLES 1, 2, 3, 4 for the present invention.

The location of damping peak position can also be controlled by changing the preparation condition of the sample. As shown in FIG. 4 and Table 1, wherein EXAMPLE 3 and EXAMPLE 4 have the same composition, but are molded at 120° C. and 160° C., respectively, the values of tan δ maximum for both the samples are just the same, while damping peak position shifts to a higher temperature at a lower molding temperature. A similar result can also be observed for EXAMPLE 1 and EXAMPLE 2.

The damping improver in the present invention not only enhance the loss tangent and control the damping peak position, but also improve the stiffness of the damping material at room temperature (25° C.). As shown in Table 2, the values of loss tangent at 25° C. for all EXAMPLES are much higher than those for COMPARATIVE EXAMPLES. Meanwhile, EXAMPLES exhibit higher values of storage modulus compared to COMPARATIVE EXAMPLES, except for COMPARATIVE EXAMPLE 3, which shows a very low loss tangent but a relative high storage modulus. Another approach to improve the stiffness is to incorporate a fourth constituent material, e.g., inorganic fibers, carbon black or carbon fibers as a reinforcing filler. As can be seen in Table 2, EXAMPLE 6 exhibits the highest storage modulus, but its loss tangent is only slightly lower than that of EXAMPLE 5.

The inventors have also disclosed that increasing loss tangent (tan δ) and loss modulus (E") simultaneously is required to enhance the efficiency of vibration and sound absorption of the damping material. As shown in Table 2, high values both in loss tangent (tan δ) and loss elastic modulus (E") are achieved efficiently by the damping improver in the present invention.

Figure 5:
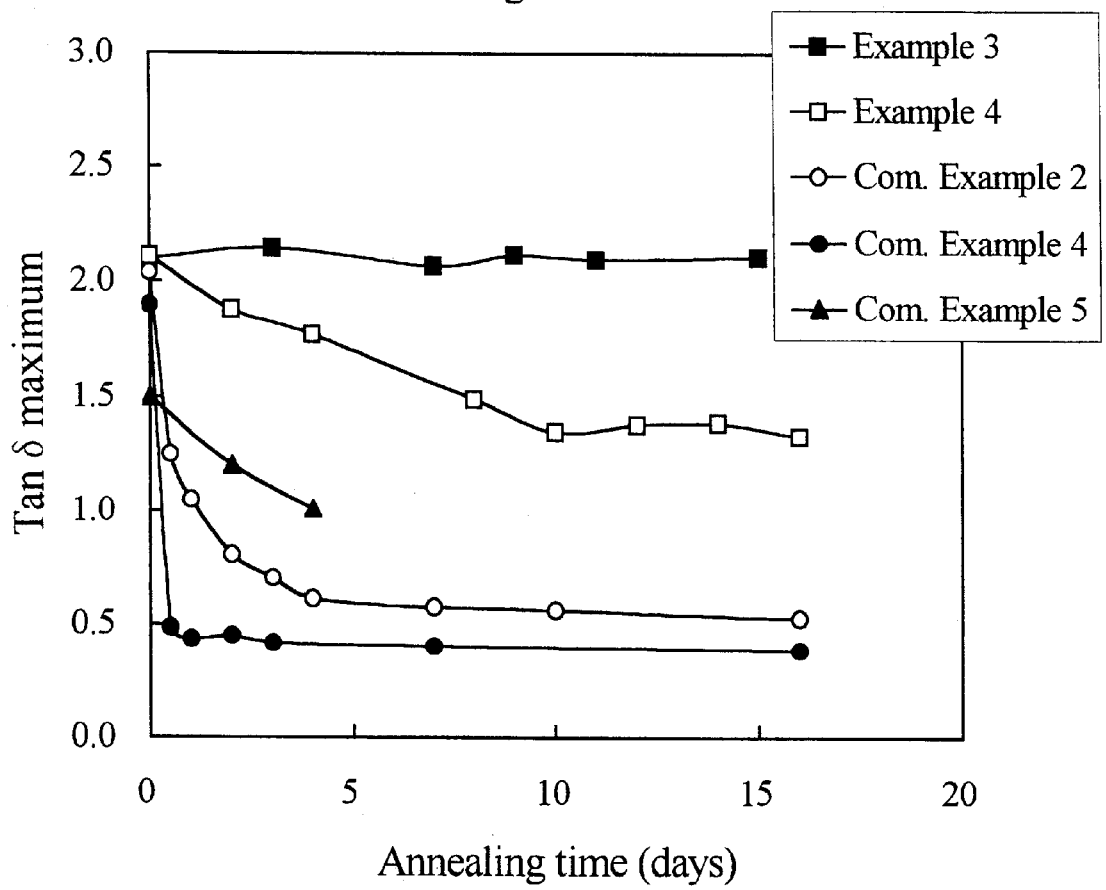
FIG. 5 shows temporal change in loss tangent (tan δ) maximum of the damping materials prepared by EXAMPLES for the present invention and those prepared by COMPARATIVE EXAMPLES.

One of the other purposes to incorporate the phenolic compound with a suitable molecular weight as Additive 2 into the damping material is to improve the stability of damping properties against aging. As shown in FIG. 5 and Table 3, although the mixtures of chlorinated polyethylene and N,N-dicyclohexyl-2-benzothiazolyl-sulfenamide as known damping materials prepared by COMPARATIVE EXAMPLES 2 and 4 have sufficiently high initial loss tangent (tan δ) maximum values, which, however, decline very fast against annealing time, indicating that they are insufficient in durability. By contrast, for EXAMPLE 3 and 4, the damping materials of the present invention, the decrease of loss tangent (tan δ) maximum is relatively slow, and the values at equilibrium are much higher than those of COMPARATIVE EXAMPLES. A similar result can be observed in FIG. 6 and Table 2, where COMPARATIVE EXAMPLES 2 and 4 present a sharp change in damping peak position against annealing, however there is no obvious shift in damping peak position for EXAMPLE 3 and 4. Furthermore, since the damping peaks of EXAMPLE 3 and 4 are around the room temperature, more efficient damping can be expected for the practical use.

Figure 6:
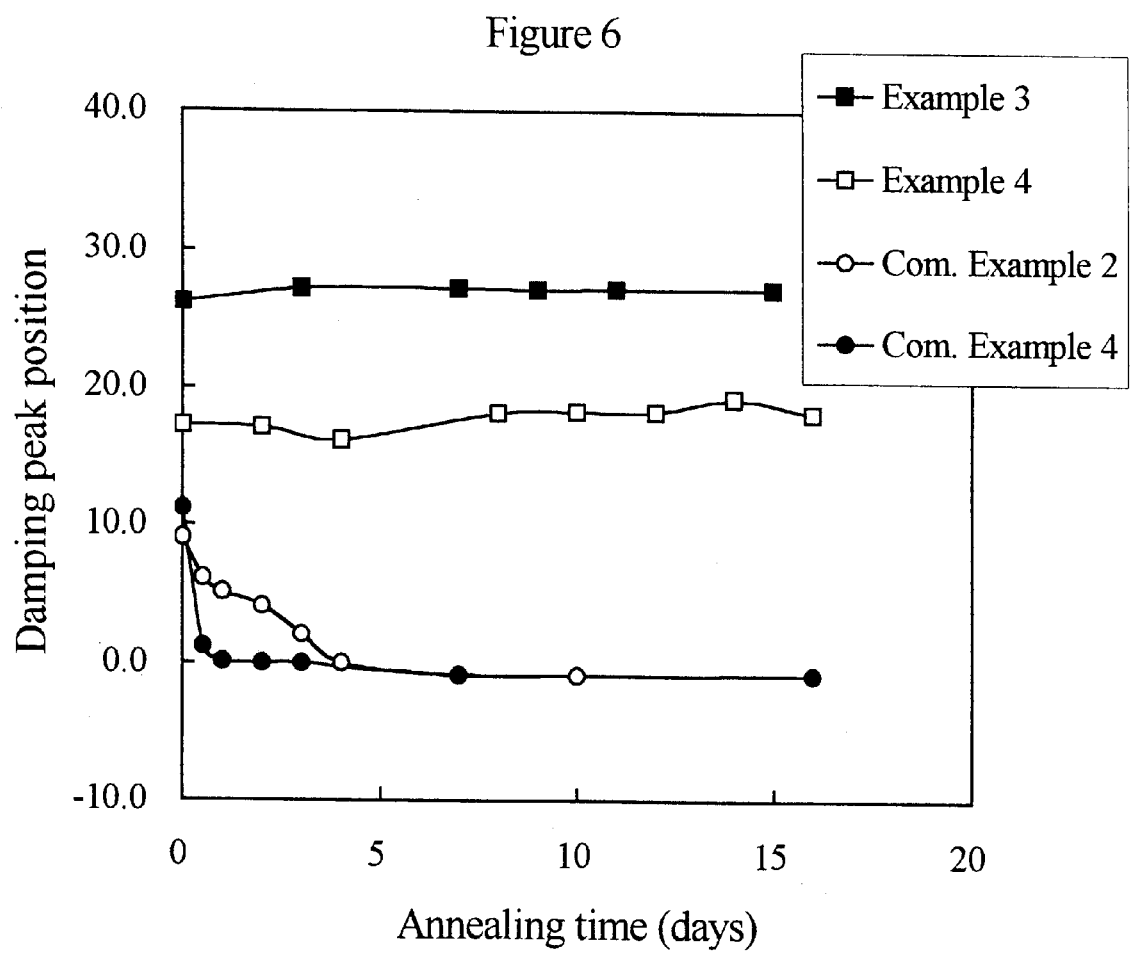
FIG. 6 shows temporal change in damping peak position of the damping materials prepared by EXAMPLES for the present invention and those prepared by COMPARATIVE EXAMPLES.

It is worth pointing out the influence of preparation condition on stability of damping properties against annealing. EXAMPLE 3 and EXAMPLE 4 have a same composition, but are molded at 120° C. and 160° C., respectively. As shown in FIGS. 5 and 6, a slow decrease in loss tangent (tan δ) maximum and a slight shift in damping position is observed for EXAMPLE 4. However, for EXAMPLE 3, there is neither a obvious decrease in loss tangent (tan δ) maximum nor little shift in damping position, indicating a perfect stability against annealing.

It should also be noted that the phenolic compound as the constituent component for the damping improver of the present invention preferably has a molecular weight of 200 or more, more preferably 230 or more, viewed from controlling aging of the damping properties. The results with the sample prepared by COMPARATIVE EXAMPLE 5, which is COMPARATIVE EXAMPLE 4 incorporated with 2-mercaptobenzothiazole, indicate that this additive is less efficient than the phenolic compound used in the present invention. The mechanisms involved in the significantly improved damping stability in the presence of the relative high molecular weight phenolic compound are not fully understood. However, since the change in damping properties against annealing may be attributed to phase separation resulting from the crystallization of the components, it is considered that the phenolic compound with a suitable molecular weight seems to hinder the crystallization of the component containing basic nitrogen because of the strong interaction between the components, in turn delays the phase separation process.

Next, the method for producing the damping material of the present invention, comprising a polymer matrix and an organic damping improver composed of a material exhibiting piezoelectric, dielectric and electroconductive effects and the second additive, is described. The method for producing the damping material of the present invention comprises two steps, step (a) and step (b).

The step (a) uniformly mixes (1) the polymer matrix and the material exhibiting piezoelectric, dielectric and electroconductive effects, and (2) the above mixture and the second specific additive which shows a strong interaction with the organic piezoelectric, dielectric and electroconductive material containing basic nitrogen and can efficiently control the crystallization and crystal growth of the components, as well as the fourth constituent material. The mixing temperature is not limited, so long as the polymer matrix can be composited with the material exhibiting piezoelectric, dielectric and electroconductive effects and other additives. More concretely, it is preferably 0 to 180° C., more preferably 20 to 100° C.

The step (b) molds the mixture produced by the above step (a) at 40 to 200° C. by hot pressing, stretching, extrusion or injection molding. The mixture of the polymer matrix and the damping improver exhibiting piezoelectric, dielectric and electroconductive effects, produced by the step (a), is molded in the step (b) at 40 to 200° C., preferably 80 to 160° C. by various processing methods.

The fillers for improving the storage modulus of the damping material, e.g., calcium carbonate, mica, talc, alumina, silica-alumina or graphite, may be added to the mixture of the polymer matrix and the damping improver comprising the material exhibiting piezoelectric, dielectric and electroconductive effects, while it is being prepared, or to one of the components, e.g., the polymer, beforehand.

It is preferable to mix the polymer matrix first with the material exhibiting piezoelectric, dielectric and electroconductive effects at a lower mixing temperature, and then to add a specific phenolic compound to the above mixture and mix them at a higher mixing temperature. This procedure can make the damping material resistant to aging of damping properties more efficiently.

The method for mixing the polymer matrix with the material exhibiting piezoelectric, dielectric and electroconductive effects is not limited. The polymer matrix is first kneaded at a temperature higher than its glass transition, then the compound is slowly added to the kneaded polymer, and the mixture is continuously kneaded after addition of the compound is completed. A radical polymerization initiator may be added to the mixture at this stage, in order to adequately bind the material exhibiting piezoelectric, dielectric and electroconductive effects to the polymer matrix, and thereby to realize an excellent damping efficiency.

The radical polymerization initiator useful for the present invention may be inorganic or organic peroxide. It may be normally benzoyl peroxide, dicumenyl peroxide, tertiary butyl perbenzoic acid, hexyne or the like. It is contained at 0.01 to 2 wt. %, preferably 0.1 to 1 wt. %.

The damping improver for the present invention, which is to be incorporated in the polymer matrix to exhibit piezoelectric, dielectric and electroconductive effects is composed of a mixture of compound (I) containing basic nitrogen and phenolic compound (II):

(I) 50 to 98 wt. % of at least one compound containing basic nitrogen, selected from the group consisting of sulfenamides, benzothiazoles, and guanidines, and (II) 50 to 2 wt. % of at least one phenolic compound shown by the general formula (1):

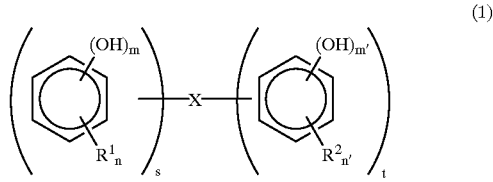

(1)

wherein,
(1) $R^1$ and $R^2$ are each a hydrocarbon group having a carbon number of 1 to 10, and may be the same or different,
(2) (n) and (n') are an integer of 0 to 3, and may be the same or different,
(3) (m) and (m') are an integer of 1 or 2, and may be the same or different,
(4) (s) and (t) are an integer of 1 to 3, and may be the same or different, and
(5) X is at least one bonding group selected from the group consisting of oxygen atom, sulfur atom, a halogen atom, a hydrocarbon group which may contain at least one of the above atoms and has a carbon number of 1 to 20, and a group containing an ester linkage.

The compound containing basic nitrogen is similar to the second constituent material of the damping material of the present invention, and sulfenamides, benzothiazoles and guanidines can be raised as the examples. For the sulfenamides, benzothiazolyl sulfenamides are preferable. The concrete examples of various benzothiazolyl sulfenamides are described earlier. The particularly preferable benzothiazolyl sulfenamides can be raised.

The phenolic compound as the second constituent element for the damping improver of the present invention is shown by the general formula (1), and, more concretely, various phenolic compounds described earlier can be raised as the examples. The phenolic compound preferably has a molecular weight of 200 or more. The preferable ones include 4,4'-thiobis(3-methyl-6-tertiary butylphenol), tetrakis[methylene(3,5-ditertiary-buty-4-hydroxycinnamate)], 4-ethyl-6-tertiary butyl-phenol, and 4-methyl-6-tertiary butylphenol.

EXAMPLES

The present invention is described more concretely by EXAMPLES and COMPARATIVE EXAMPLES, which by no means limit the present invention. "Wt. %" for the content of each constituent components described in EXAMPLES and COMPARATIVE EXAMPLES is based on the whole damping material.

Performance of each damping material is evaluated by loss tangent (tan δ) maximum, damping peak position and their temporal changes, as well as loss tangent (tan δ), storage modulus (E'), and loss modulus (E") at 25° C. as the normal service temperature for the damping.

Storage modulus (E'), loss elastic modulus (E"), loss tangent (tan δ) and damping peak position were determined by a dynamic mechanical analyzer (DVA-200S from ITK Instrument Co.) in tension mode at a frequency of 10 Hz and a heating rate of 5° C./min from −50 to 200° C.

The following materials were used in EXAMPLES and COMPARATIVE EXAMPLES:

Chlorinated polyethylene: Elaslene 301A(F) from Showa Denko's

N,N-dicyclohexyl-2-benzothiazolysulfenamide: Nocceler DZ-G from Oouchi Shinko Kagaku Kougyou Co.

4,4'-Thio-bis(3-methyl-6-tert-butylphenol): Nonflex BPS-R from Seiko Kagaku Co.

VGCF: Vapor-Growth Carbon Fiber from Showa Denko Co.

Example 1

A mixture of 30 wt. % of chlorinated polyethylene as the polymer matrix (hereinafter referred to as Matrix) and 60 wt. % of N,N-dicyclohexyl-2-benzothiazolysulfenamide as the material exhibiting piezoelectric, dielectric and electroconductive effects (hereinafter referred to as Additive 1) was first mixed by a two-roll mill at 40 to 60° C. for 10 min. The mixture was then incorporated with 10 wt. % of 4,4'-Thio-bis(3-methyl-6-tert-butylphenol) having a molecular weight of 358.6 (hereinafter referred to as Additive 2), and well mixed at 70 to 90° C. for 10 min. The mixture was preheated by a hot-pressing machine at 160° C. for 10 min and molded under a pressure of 19.6 MPa (200 Kgf/cm²) for 10 min, followed by quenching into water to obtain a damping material sheet with a thickness of 0.5 mm. The damping properties were measured immediately after the mixture was molded. To check the composition effect on the damping, a series of samples were also prepared under the same preparation condition, but only changing the composition of the three components. The evaluation results are given in FIGS. 1, 2, 3 and Tables 1, 2.

Example 2

A mixture of 30 wt. % of chlorinated polyethylene as Matrix and 60 wt. % of N,N-dicyclohexyl-2-benzothiazolysulfenamide as Additive 1 was first mixed by a two-roll mill at 40 to 60° C. for 10 min. The mixture was then incorporated with 10 wt. % of 4,4'-Thio-bis(3-methyl-6-tert-butylphenol) as Additive 2), and well mixed at 70 to 90° C. for 10 min. The mixture was preheated by a hot-pressing machine at 120° C. for 10 min and molded under a pressure of 19.6 MPa (200 Kgf/cm$^2$) for 10 min, followed by quenching into water to obtain a damping material sheet with a thickness of 0.5 mm. The damping properties were measured immediately after the mixture was molded. The evaluation results are given in FIG. 4 and Tables 1, 2.

Example 3

A mixture of 45 wt. % of chlorinated polyethylene as Matrix and 45 wt. % of N,N-dicyclohexyl-2-benzothiazolysulfenamide as Additive 1 was first mixed by a two-roll mill at 40 to 60° C. for 10 min. The mixture was then incorporated with 10 wt. % of 4,4'-Thio-bis(3-methyl-6-tert-butylphenol) having a molecular weight of 358.6 as Additive 2, and well mixed at 70 to 90° C. for 10 min. The mixture was preheated by a hot-pressing machine at 120° C. for 10 min and molded under a pressure of 19.6 MPa (200 Kgf/cm$^2$) for 10 min, followed by quenching into water to obtain a damping material sheet with a thickness of 0.5 mm. The damping properties were measured immediately after the mixture was molded, and after the as-mold sheet was annealed at 50° C. in a vacuum oven for several days. The evaluation results are given in FIGS. 4, 5, 6 and Tables 1, 2, 3, 4.

Example 4

A mixture of 45 wt. % of chlorinated polyethylene as Matrix and 45 wt. % of N,N-dicyclohexyl-2-benzothiazolysulfenamide as Additive 1 was first mixed by a two-roll mill at 40 to 60° C. for 10 min. The mixture was then incorporated with 10 wt. % of 4,4'-Thio-bis(3-methyl-6-tert-butylphenol) having a molecular weight of 358.6 as Additive 2, and well mixed at 70 to 90° C. for 10 min. The mixture was preheated by a hot-pressing machine at 160° C. for 10 min and molded under a pressure of 19.6 MPa (200 Kgf/cm$^2$) for 10 min, followed by quenching into water to obtain a damping material sheet with a thickness of 0.5 mm. The damping properties were measured immediately after the mixture was molded, and after the as-mold sheet was annealed at 50° C. in a vacuum oven for several days. The evaluation results are given in FIGS. 4, 5, 6 and Tables 1, 3, 4.

Example 5

A mixture of 40 wt. % of chlorinated polyethylene as Matrix and 40 wt. % of N,N-dicyclohexyl-2-benzothiazolysulfenamide as Additive 1 was first mixed by a two-roll mill at 40 to 60° C. for 10 min. The mixture was then incorporated with 20 wt. % of 4,4'-Thio-bis(3-methyl-6-tert-butylphenol) having a molecular weight of 358.6 as Additive 2, and well mixed at 70 to 90° C. for 10 min. The mixture was preheated by a hot-pressing machine at 160° C. for 10 min and molded under a pressure of 19.6 MPa (200 Kgf/cm$^2$) for 10 min, followed by quenching into water to obtain a damping material sheet with a thickness of 0.5 mm. The damping properties were measured immediately after the mixture was molded. The evaluation results are given in Tables 1, 2.

Example 6

A mixture of 34 wt. % of chlorinated polyethylene as Matrix and 34 wt. % of N,N-dicyclohexyl-2-benzothiazolysulfenamide as Additive 1 was first mixed by a two-roll mill at 40 to 60° C. for 10 min. The mixture was then incorporated with 17 wt. % of 4,4'-Thio-bis(3-methyl-6-tert-butylphenol) having a molecular weight of 358.6 as Additive 2 and 15 wt. % of VGCF (Vapor-Growth Carbon Fiber from Showa Denko Co.) as the reinforcing filler, and well mixed at 70 to 90° C. for 10 min. The mixture was preheated by a hot-pressing machine at 160° C. for 10 min and molded under a pressure of 19.6 MPa (200 Kgf/cm$^2$) for 10 min, followed by quenching into water to obtain a damping material sheet with a thickness of 0.5 mm. The damping properties were measured immediately after the mixture was molded. The evaluation results are given in Table 2.

Comparative Example 1

Only chlorinated polyethylene as Matrix was kneaded by a two-roll mill at 40 to 60° C. for 10 min, then was preheated by a hot-pressing machine at 160° C. for 10 min and molded under a pressure of 19.6 MPa (200 Kgf/cm$^2$) for 10 min, followed by quenching into water to obtain a damping material sheet with a thickness of 0.5 mm. The damping properties were measured immediately after the mixture was molded. The evaluation results are given in FIG. 1 and Tables 1, 2.

Comparative Example 2

A mixture of 50 wt. % of chlorinated polyethylene as Matrix and 50 wt. % of N,N-dicyclohexyl-2-benzothiazolysulfenamide as Additive 1 was well mixed by a two-roll mill at 40 to 60° C. for 10 min. The mixture was preheated by a hot-pressing machine at 160° C. for 10 min and molded under a pressure of 19.6 MPa (200 Kgf/cm$^2$) for 10 min, followed by quenching into water to obtain a damping material sheet with a thickness of 0.5 mm. The damping properties were measured immediately after the mixture was molded, and after the as-mold sheet was annealed at 50° C. in a vacuum oven for several days. The evaluation results are given in FIGS. 1, 4, 5, 6 and Tables 1, 2, 3, 4.

Comparative Example 3

A mixture of 50 wt. % of chlorinated polyethylene as Matrix and 50 wt. % of 4,4'-Thio-bis(3-methyl-6-tert-butylphenol) having a molecular weight of 358.6 as Additive 2 was well mixed by a roll mixer at 70 to 90° C. for 10 min. The mixture was preheated by a hot-pressing machine at 160° C. for 10 min and molded under a pressure of 19.6 MPa (200 Kgf/cm$^2$) for 10 min, followed by quenching into water to obtain a sheet with a thickness of 0.5 mm. The damping properties were measured immediately after the mixture was molded. The evaluation results are given in FIG. 1 and Tables 1, 2.

Comparative Example 4

A mixture of 50 wt. % of chlorinated polyethylene as Matrix and 50 wt. % of N,N-dicyclohexyl-2-benzothiazolysulfenamide as Additive 1 was well mixed by a two-roll mill at 40 to 60° C. for 10 min. The mixture was preheated by a hot-pressing machine at 120° C. for 10 min and molded under a pressure of 19.6 MPa (200 Kgf/cm$^2$) for 10 min, followed by quenching into water to obtain a damping material sheet with a thickness of 0.5 mm. The damping properties were measured immediately after the mixture was molded, and after the as-mold sheet was annealed at 50° C. in a vacuum oven for several days. The evaluation results are given in FIGS. 4, 5, 6 and Tables 1, 2, 3, 4.

Comparative Example 5

A mixture of 45 wt. % of chlorinated polyethylene as Matrix and 45 wt. % of N,N-dicyclohexyl-2-benzothiazolysulfenamide as Additive 1 was first mixed by a two-roll mill at 40 to 70° C. for 10 min. The mixture was then incorporated with 10 wt. % of 2-mercaptobenzothiazole having a molecular weight of 167.2 as Additive 2, and well mixed at 80 to 90° C. for 1.0 min. The mixture was preheated by a hot-pressing machine at 120° C. for 10 min and molded under a pressure of 19.6 MPa (200 Kgf/cm$^2$) for 10 min, followed by quenching into water to obtain a damping material sheet with a thickness of 0.5 mm. The damping properties were measured immediately after the mixture was molded, and after the as-mold sheet was annealed at 50° C. in a vacuum oven for several days. The evaluation results are given in FIG. 5 and Table 3.

It is apparent that, when the results of EXAMPLES are compared with those of COMPARATIVE EXAMPLES, the damping material of the present invention with a polymer having a polar side chain as the matrix dispersed with a damping improver comprising a mixture of specific compound containing basic nitrogen and organic compound having a phenolic group shown by the general formula (1) is much higher and less temporarily aging in damping efficiency than the damping materials prepared by any COMPARATIVE EXAMPLE. Moreover, the damping improver exhibiting piezoelectric, dielectric and electroconductive effects for the damping material of the present invention can successfully improve both the loss tangent (tan δ) and loss elastic modulus (E") at room temperature simultaneously, and can freely control the damping peak position to locate within a required temperature region by changing the composition or the preparation condition as well.

TABLE 1

Comparison of loss tangent maximum and damping peak position

|  | loss tangent maximum (tan δ) | damping peak position (° C.) |
|---|---|---|
| Example 1 | 3.59 | 28.3 |
| Example 2 | 3.38 | 33.3 |
| Example 3 | 2.10 | 26.2 |
| Example 4 | 2.11 | 17.2 |
| Example 5 | 2.07 | 34.2 |
| Comparative Example 1 | 0.88 | −7.9 |
| Comparative Example 2 | 2.04 | 9.15 |
| Comparative Example 3 | 0.16 | −7.8 |
| Comparative Example 4 | 1.90 | 11.3 |

TABLE 2

Comparison of loss tangent, storage modulus and Loss modulus at 25° C.

|  | Loss tangent (tan δ) | Storage modulus (E'/Pa) | Loss modulus (E"/Pa) |
|---|---|---|---|
| Example 1 | 3.13 | 1.36E+7 | 4.26E+7 |
| Example 2 | 1.43 | 1.11E+8 | 1.59E+8 |
| Example 3 | 2.06 | 1.24E+7 | 2.55E+7 |
| Example 5 | 0.94 | 1.43E+8 | 1.34E+8 |
| Example 6 | 0.71 | 3.38E+8 | 2.40E+8 |
| Comparative Example 1 | 0.15 | 6.64E+6 | 1.00E+6 |
| Comparative Example 2 | 0.51 | 1.97E+6 | 1.00E+6 |
| Comparative Example 3 | 0.10 | 4.20E+8 | 4.20E+7 |
| Comparative Example 4 | 0.64 | 2.23E+6 | 1.43E+6 |

TABLE 3

Temporal changes in maximum loss tangent (tan δ)

| Test days | Example 3 | Example 4 | Com. Example 2 | Com. Example 4 |
|---|---|---|---|---|
| 0 | 2.10 | 2.11 | 2.04 | 2.04 |
| 1 |  |  | 1.05 | 0.436 |
| 2 |  | 1.88 | 0.81 | 0.45 |
| 3 | 2.15 |  | 0.70 | 0.42 |
| 4 |  | 1.77 | 0.61 |  |
| 7 | 2.07 |  | 0.57 | 0.40 |
| 10 |  | 1.35 | 0.56 |  |
| 11 | 2.10 |  |  |  |
| 15 | 2.11 |  |  |  |
| 16 |  | 1.33 | 0.53 | 0.38 |

TABLE 4

Temporal changes in damping peak position (° C.)

| Test days | Example 3 | Example 4 | Com. Example 2 | Com. Example 4 |
|---|---|---|---|---|
| 0 | 26.20 | 17.20 | 9.15 | 11.25 |
| 1 |  |  | 5.25 | 0.15 |
| 2 |  | 17.15 | 4.25 | 0.05 |
| 3 | 27.25 |  | 2.15 | 0.05 |
| 4 |  | 16.2 | 0.05 |  |
| 7 | 27.25 |  | −0.85 | −0.8 |
| 10 |  | 18.25 | −0.85 |  |
| 11 | 27.20 |  |  |  |
| 15 | 27.20 |  |  |  |
| 16 |  | 18.15 | −0.80 | −0.8 |

EFFECTS OF THE INVENTION

The present invention provides an organohybrid-based damping material, a damping improver exhibiting piezoelectric, dielectric and electroconductive effects, and their producing methods. The damping material provided by the present invention is high in damping efficiency, controlled in functional deterioration when put in service for extended periods, and hence stably exhibiting highly functional damping performance. As the damping peak position can be controlled freely, this kind of damping material is applicable to different application temperature regions and can go into various areas, including electric appliances (e.g., washing machines and refrigerators), automobiles (e.g., floor sheets and ceiling materials), and construction materials for interiors (e.g., floors and other interiors).

What is claimed is:

1. An organohybrid-based damping material, comprising at least a polymer matrix having a polar side chain and an organic damping improver exhibiting piezoelectric, dielectric and electroconductive effects, wherein said organic damping improver is composed of a mixture of a compound (I) containing basic nitrogen and phenolic compound (II):
(I) at least one compound containing basic nitrogen, selected from the group consisting of sulfenamides, benzothiazoles, benzotriazoles and guanidines, and
(II) at least one phenolic compound shown by the general formula (1):

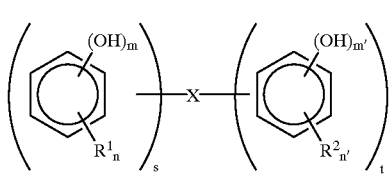

(1)

wherein,
(1) $R^1$ and $R^2$ are each a hydrocarbon group having a carbon number of 1 to 10, and may be the same or different,
(2) (n) and (n') are an integer of 0 to 3, and may be the same or different,
(3) (m) and (m') are an integer of 1 or 2, and may be the same or different,
(4) (s) and (t) are an integer of 1 to 3, and may be the same or different, and
(5) X is at least one bonding group selected from the group consisting of oxygen atom, sulfur atom, a hydrocarbon group having a carbon number of 1 to 20 which may contain at least one of member selected from the group consisting of the above atoms and a halogen atom, and a group containing an ester linkage.

2. The damping material according to claim 1, wherein said polymer matrix is at least one type of polymer selected from the group consisting of chlorinated polyolefins, polyvinylidene chloride, fluorinated polyolefins, polyvinylidene fluoride and polyurethane.

3. The damping material according to claim 1, wherein said sulfenamide is a benzothiazolyl sulfenamide.

4. The damping material according to claim 3, wherein said benzothiazolyl sulfenamide is at least one sulfenamide-based compound selected from the group consisting of N-cyclohexyl-2-benzothiazolyl sulfenamide, N-tertiary butyl-2-benzothiazolyl sulfenamide, N-oxydiethylene-2-benzothiazolyl sulfenamide, N,N-diisopropyl-2-benzothiazolyl sulfenamide, and N,N-dicyclohexyl-2-benzothiazolyl sulfenamide.

5. The damping material according to claim 1, wherein said phenolic compound is at least one compound selected from the group consisting of 4,4'-thiobis(3-methyl-6-tertiary butylphenol), 4,4'-methylenebis(2,6-ditertiary butylphenol), 4,4'-butylidenebis(3-methyl-6-tertiary butylphenol), 2,2'-methylenebis(4-ethyl-6-tertiary butylphenol), 2,2'-methylenebis(4-methyl-6-tertiary butylphenol), 2,2'-methylenebis(4-methyl-6-nonylphenol), tetrakis[methylene (3,5-ditertiary-buty-4-hydroxycinnamate)], and 1,1,3-tris(5-tertiary-butyl-4-hydroxy-2-methyl-phenyl)butane.

6. The damping material according to claim 1 or 5, wherein said phenolic compound has a molecular weight of 200 or more.

7. The damping material according to claim 1 or 5, wherein said phenolic compound is contained at 2 to 50 wt. %, based on the total quantity of itself and said compound having basic nitrogen.

8. The damping material according to claim 1, wherein said damping improver exhibiting piezoelectric, dielectric and electroconductive effects can be contained at 5 to 80 wt. %, based on the whole damping material.

9. The damping material according to claim 1, which is further incorporated with, as a fourth constituent material, at least one type of reinforcing filler selected from the group consisting of inorganic fibers, carbon black and carbon fibers.

10. A damping improver, which is to be incorporated in the polymer matrix to exhibit piezoelectric, dielectric and electroconductive effects, is composed of a mixture of compound (I) containing basic nitrogen and phenolic compound (II) as the major ingredients:
(I) at least one compound containing basic nitrogen, selected from the group consisting of sulfenamides, benzothiazoles, and guanidines, and
(II) at least one phenolic compound shown by the general formula

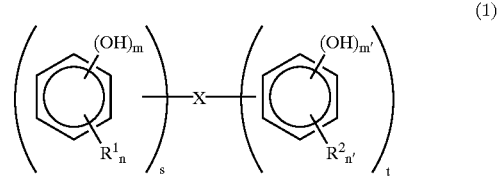

(1)

wherein,
(1) $R^1$ and $R^2$ are each a hydrocarbon group having a carbon number of 1 to 10, and may be the same or different,
(2) (n) and (n') are an integer of 0 to 3, and may be the same or different,
(3) (m) and (m') are an integer of 1 or 2, and may be the same or different,
(4) (s) and (t) are an integer of 1 to 3, and may be the same or different, and
(5) X is at least one bonding group selected from the group consisting of oxygen atom, sulfur atom, a hydrocarbon group which may contain at least one of the above atoms and has a carbon number of 1 to 20, and a group containing an ester linkage.

11. The damping material according to claim 1, wherein ratio of the polymer matrix and the damping improver is from 80/20 to 20/80 by weight.

12. The damping material according to claim 1, wherein X in the general formula (1) is a bonding group selected from one of the following formulae:

(1)

(2)

(3)

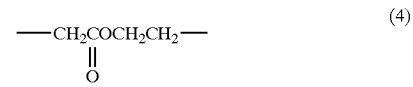

(4)

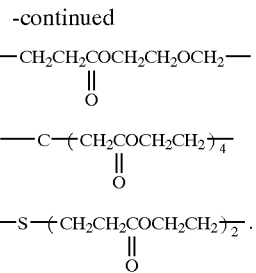

13. The damping material according to claim 1, wherein said phenolic compound is at least one compound selected from the group consisting of:

4,4'-thiobis(3-methyl-6-tertiary butylphenol);
4,4'-thiobis(2-methyl-6-tertiary butylphenol);
4,4'-thiobis(4,6-ditertiary butylphenol);
4,4'-methylenebis(2,6-ditertiary butylphenol);
4,4'-ethylenebis(2,6-ditertiary butylphenol);
4,4'-propylenebis(2-methyl-6-tertiary butylphenol);
2,2'-methylenebis(4-ethyl-6-tertiary butylphenol);
2,2'-methylenebis(4-methyl-6-tertiary butylphenol);
4,4'-butylidenebis(3-methyl-6-tertiary butylphenol);
4,4'-isopropylidenebis(2,6-ditertiary butylphenol);
2,2'-methylenebis(4-methyl-6-nonylphenol);
2,2'-isobutylidenebis(4,6-dimethylphenol);
2,2'-methylenebis(4-methyl-6-cyclohexylphenol);
1,6-hexanediol-bis[β-(3,5-ditertiary-butyl-4-hydroxyphenol)propionate];
1,4-bis(4-benzoyl-3-hydroxyphenoxy)-butane;
2,2-thio-diethylenebis[β-(3,5-ditertiary-butyl-4-hydroxyphenyl)propionate];
tris(3,5-ditertiary-butyl-4-hydroxybenzyl)-isocyanurate;
1,1,3-tris(5-tertiary-butyl-4-hydroxy-2-methylphenyl)butane;
1,3,5-trimethyl-2,4,6-tris(3,5-ditertiary-butyl-4-hydroxybenzyl)-benzene;
tetrakismethylene 3,5-ditertiary butyl-4-hydroxycinnamate;
triethyleneglycol-bis[β-(3,5-ditertiary-butyl-5-methyl-4-hydroxy-phenyl)propionate] and
3,9-bis[1,1-dimethyl-2-[β-(3-tertiary-butyl-4-hydroxy-5-methylphenyl)-propionyloxyethyl]ethyl]-2,4,8,10-tetraoxospiro-[5,5]undecane.

* * * * *